H. W. WARD.
RHEOSTAT.
APPLICATION FILED MAR. 6, 1917.

1,244,929.

Patented Oct. 30, 1917.
4 SHEETS—SHEET 1.

WITNESSES:

INVENTOR
Harry W. Ward
BY
William M. Swan
ATTORNEY

H. W. WARD.
RHEOSTAT.
APPLICATION FILED MAR. 6, 1917.

1,244,929.

Patented Oct. 30, 1917.
4 SHEETS—SHEET 3.

WITNESSES:
J. Engleheart
C. C. Jones

INVENTOR
Harry W. Ward
BY
William M. Chyan
ATTORNEY.

H. W. WARD.
RHEOSTAT.
APPLICATION FILED MAR. 6, 1917.

1,244,929.

Patented Oct. 30, 1917.
4 SHEETS—SHEET 4.

WITNESSES:
J. Engleheart
C. C. Jones

INVENTOR
Harry W. Ward
BY
William M. Swan
ATTORNEY

UNITED STATES PATENT OFFICE.

HARRY W. WARD, OF DETROIT, MICHIGAN.

RHEOSTAT.

1,244,929.    Specification of Letters Patent.    Patented Oct. 30, 1917.

Application filed March 6, 1917. Serial No. 152,870.

*To all whom it may concern:*

Be it known that I, HARRY W. WARD, a citizen of the United States, residing at Detroit, county of Wayne, State of Michigan, have invented a certain new and useful Improvement in Rheostats, and declare the following to be a full, clear, and exact description of the same, such as will enable others skilled in the art to which it pertains to make and use the same, reference being had to the accompanying drawings, which form a part of this specification.

This invention relates to rheostats, and has for its object an improved arrangement of parts which is not only easily portable from one testing place to another, but whose resistance to the current to be tested may be varied easily and with exact knowledge on the part of the operator as to the degree of change which his various adjustments of the parts is effecting.

Figure 3:
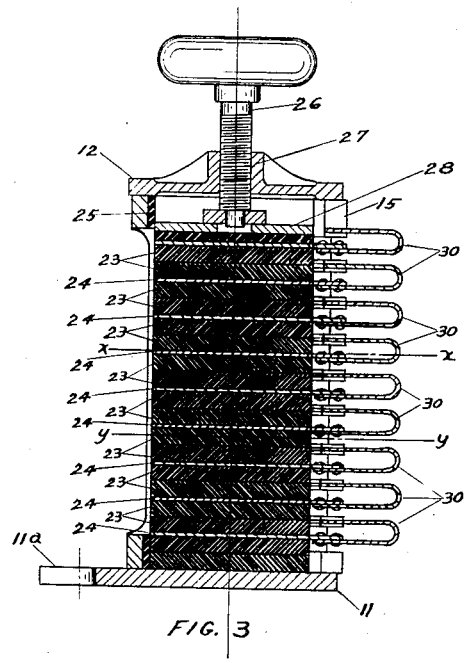
Fig. 3 is a sectional elevation through the center of the device.
Figure 4:
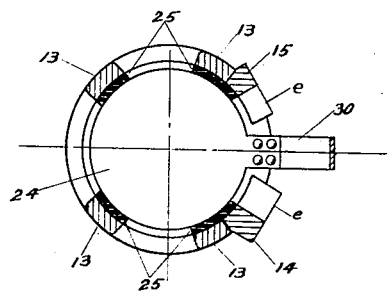
Fig. 4 is a sectional plan taken along the line $x$—$x$ of Fig. 3.
Figure 5:
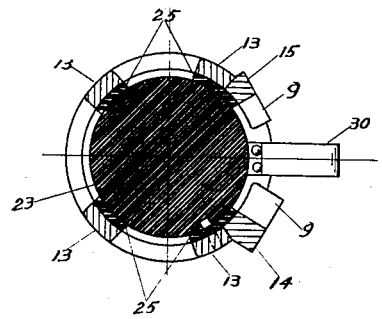

Fig. 5 is a similar sectional plan, taken along the line $y$—$y$ of Fig. 3, which is located at such a point, from top to bottom of the rheostat, that one of the carbon disks is herein cut through, and consequently shown in section.

Figure 8:
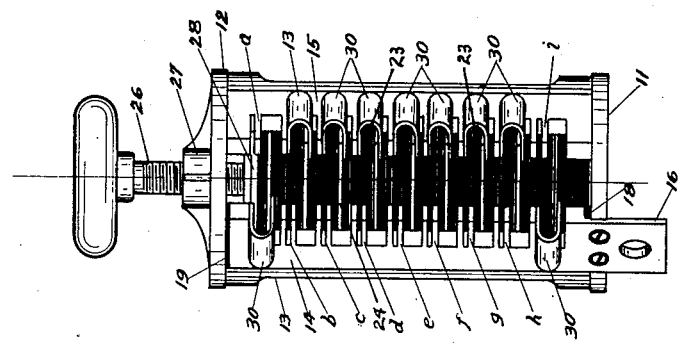
Figure 7:
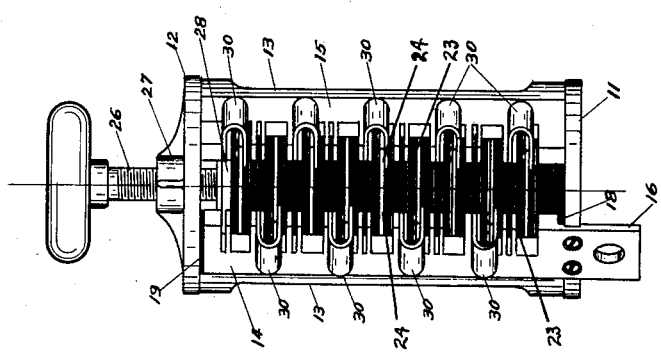
Figure 6:
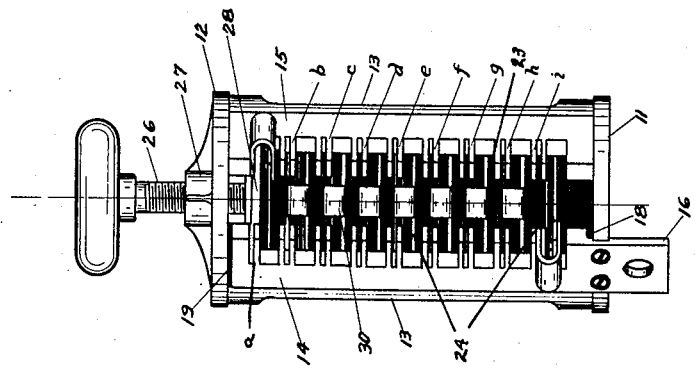

Figs. 6, 7, and 8 are elevational views of the rheostat with the copper plates in various contact groupings, as shown by the positions of their projecting lugs relatively to the knife contacts on the frame.

The holding frame of this device consists of a base 11 and a top 12, connected by one or more bars or rods 13, as well as a pair of special bars or strut members 14 and 15, which carry their several knife contacts $a$, $b$, $c$, $d$, etc., on their adjacent sides. One of these struts, as 14, has a projecting tongue 16 to which one terminal of a line wire 17 is adapted to be attached. The portion of the strut 14 and of its tongue 16 which lies adjacent the base 11 is protectively spaced therefrom by the insulation 18; similarly the upper end is spaced from the top 12 by the insulation 19; even the screws 20 which hold it in place with respect to the top 12 are protected by insulating bushings 21, so that the entire strut 14 stands electrically isolated from the rest of the device except when one or more of the copper disks is purposely moved into contact therewith, as hereinafter explained.

The base 11 has a projecting tongue 11$^a$ especially adapted for attachment to a battery terminal 22. As regards connection and current path, the base 11, top 12 and strut 15 are one piece, but until one or more of the copper disks is moved, as already mentioned, into contact with one of the knife contacts, no current flow occurs. One at least of the contact tongues of the contact disks must be moved into contact with its corresponding knife switch on the strut 14 before any flow of current can take place, since only by this means is the gap between the normally isolated parts 14 and 15 bridged. So long, however, as one of these disks is thus in contact with the strut 14, it is entirely a matter of adaptation to the conditions of use then existing how many more are placed in similar position, or whether some disks are placed in contact with the strut 14 and some with the strut 15.

Within the frame or cage are located the desired number of carbon disks 23 and copper disks 24, arranged alternately, and the peripheral edges of all of these are spaced from the adjacent inner faces of the rod and strut members by insulating pads 25. The degree of contact between the several laminæ thus disposed may be regulated by the screw 26, which engages through the centrally threaded spider 27, which constitutes part of the top 12, the lower end of the screw 26 being connected with a brass pressure plate 28, by which its pressure is distributed evenly over the top surface of the carbon disk immediately therebeneath, and through it to the other laminæ beneath it. As is well known, carbon is neither an ideal conductor nor a perfect insulator, consequently when any of the copper disks are in the contact position described with respect to the strut 14, a certain quantity of current flow takes place; the fewer the copper disks that are in circuit, the greater is the resistance to the flow of current.

Each one of the copper plates 24 has a projecting tongue 30, preferably of the looped form shown particularly in elevational Figs. 6, 7 and 8, adapted to engage in the corresponding knife contacts in the adjacent faces of the struts 14 and 15.

Figure 1:
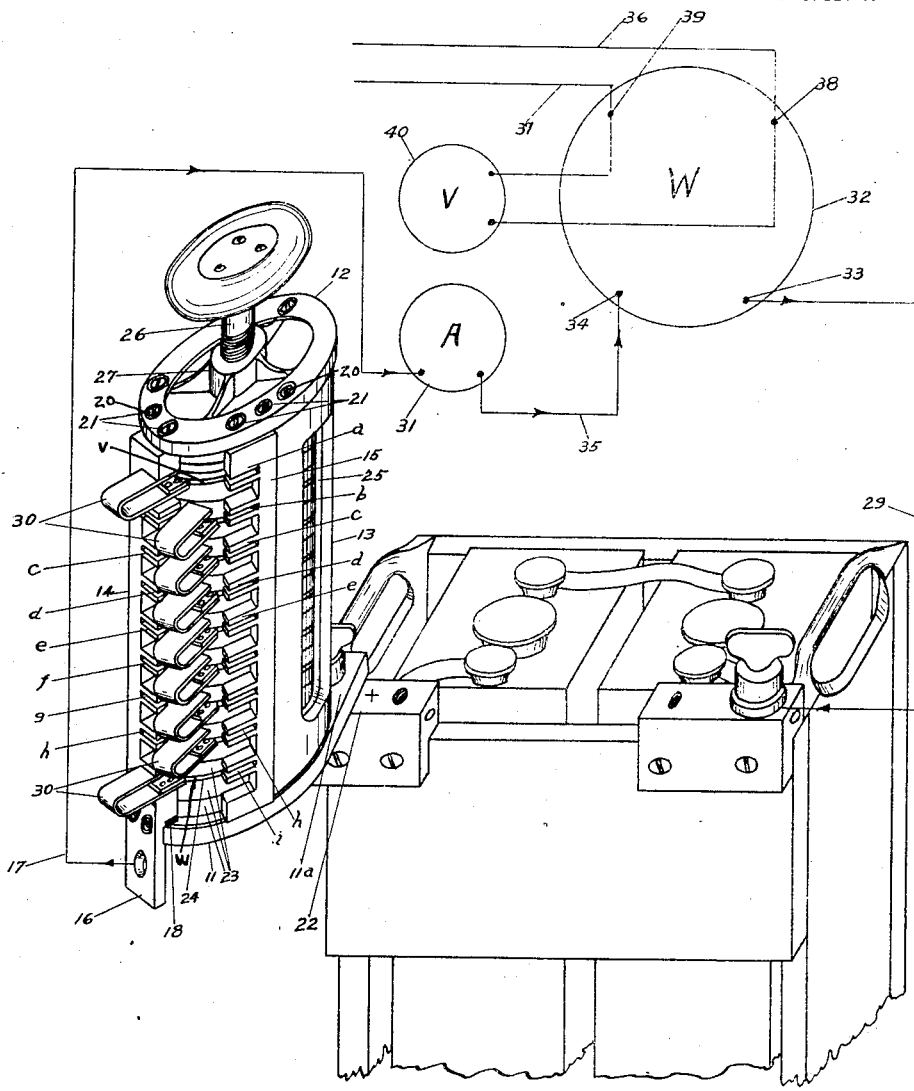
Figure 1 is a perspective of the device shown with full battery and line connections, and with current line connections diagrammatically shown.
Figure 2:
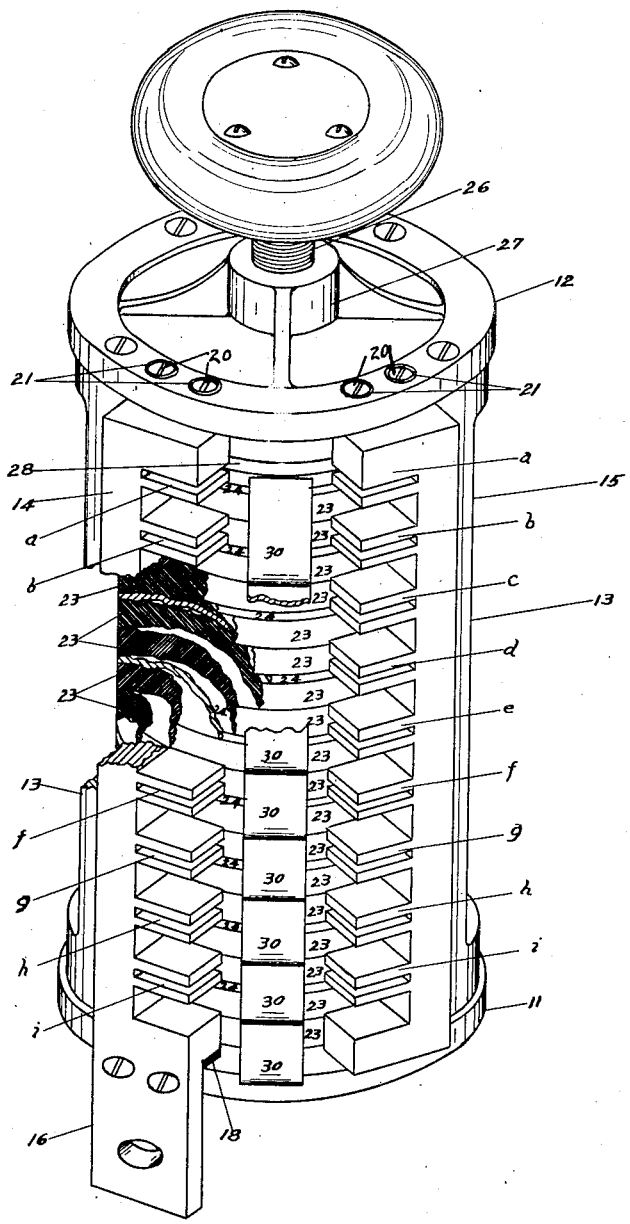
Fig. 2 is a large-scale perspective of the entire device, with parts broken away to illustrate the lamination arrangement of the copper disks and the carbon disks.

The operation of this device, which is particularly adapted for convenient carrying around from place to place, and quick connection with the meter, whose testing is desired, is as follows:—One terminal 17 of the cable being connected with the tongue 16, and the tongue 11ª of the base 11 being similarly connected with the jar battery terminal 22, the terminals of this wire and of the other battery wire 29 are connected respectively with the amperemeter 31 and one of the terminals 33 of the wattmeter 32. The other pole of the amperemeter and the remaining pole 34 of the wattmeter are then connected by the wire 35, while the terminals 36 and 37 of the outside line wire are in like manner connected up with the poles 38 and 39 of the wattmeter and with the voltmeter 40. The current derived from the jar battery does not ordinarily exceed three volts, so that this degree of current, when flowing through the rheostat, is of such negligible degree that its metallic frame or cage can be handled without inconvenience. So long, however, as all of the copper disks 24 therein are in neutral position, that is out of engagement with the knife contacts of either one of the struts 14 and 15, the circuit is incomplete, and no flow of current takes place. When however, even one of the tongues 30, and with it its copper disk, is moved so as to be in engagement with any one of the knife contacts on the strut 14, as for example 14ª, a circuit is made and a slight current is allowed to pass, the small degree thereof being due to the large number of laminæ of carbon disks 23, through which the current from one terminal, as 11ª, must pass before reaching the electrically integral parts of the other terminal 16. This is the most direct path possible to be traversed. If a greater flow of current and consequently less resistance, is desired, individual tongues 30 are swung from their central or neutral position into, for example, the staggered relation shown in Fig. 7, or whatever other grouping may be desired, such as, for example, the upper tongue and lower tongue in engagement with their contacts 14ª and 14¹ respectively, while the intermediate tongues are in engagement with the contacts 15ᵇ to 15ʰ inclusive, as shown in Fig. 8. The current may thus be caused to travel as circuitously as the particular test conditions may require. And as between one of the lower disks, as for example that marked $w$ in Fig. 1, and one of the upper disks as $v$, a greater flow of current can be secured by swinging the lower one $w$ into contact with its knife contact 14¹ than can be secured if the disk $v$ is similarly moved to engage its knife contact 14ª, because of the much shorter distance the current has to travel before reaching the strut 14. It is thus obvious that various degrees and combinations of effects may be secured by selective movement of these disks as particular conditions may suggest.

What I claim is:

1. In a rheostat, in combination with a frame, a pair of oppositely disposed struts in said frame having a plurality of contact terminals, insulating means whereby one of said struts is isolated from the remaining parts of the frame, and a plurality of carbon disks and metallic disks alternatingly disposed within said frame, said metallic disks being adapted to be individually moved into position of engagement with the terminals of one or the other of said struts, thereby varying the electrical resistance to a current passing through said struts.

2. In a rheostat, the combination of a frame provided with a plurality of strut members, insulated from one another, a plurality of carbon disks disposed within said frame, a plurality of metallic disks alternating with said carbon disks within said frame, each of said metallic disks being adapted to be moved in its own plane into position of contact with either of said strut members to effect a variation in the resistance to a current passed therethrough and through said strut members, and means for varying the degree of superficial contact between said carbon disks and said metallic disks.

3. In a rheostat, the combination of a frame, an adjustable compression member acting lengthwise thereof, a plurality of alternately arranged carbon disks and metallic disks arranged transversely of the longitudinal axis of said frame and adapted to be acted upon by said compression member, and a pair of strut members each having a plurality of contact terminals adapted to be engaged by complementary portions of said metallic disks when moved rotatably of the central axis of said frame, to vary the resistance to an electrical current passed therethrough.

4. In a rheostat, in combination with a series of alternatingly arranged carbon disks and metallic disks, means for varying the degree of contact between their adjacent surfaces, and a pair of strut members, having a plurality of contact points adapted to be engaged by a complementary portion of each of said metallic disks when selectively rotated within their own planes.

5. A rheostat, having in combination with a series of alternatingly arranged metallic disks and carbon disks, a containing frame therefor, having electrically isolated portions adapted to be engaged by projecting portions of each of said metallic disks when the same are rotatively moved in their own planes, each of said portions of the frame being adapted to be connected with the terminals of an electrical circuit.

6. In a rheostat, the combinaion of a pair of circuit terminals, having a plurality of contact points disposed oppositely to one another lengthwise of the device, and a plurality of alternated layers of metallic disks and insulating disks disposed transversely of the longitudinal axis of the device, each of said metallic disks being adapted to be moved rotatively in its own plane to effect the engagement of a projecting portion thereof with the corresponding contact point on one or the other of said circuit terminals.

7. A rheostat, having, in combination with a frame provided with circuit terminal connections and with a plurality of pairs of contact points normally insulated from one another, a series of alternatingly disposed disks of metal and of insulating material normally disposed in neutral position with respect to the contact points on either side, said metal disks being selectively adapted to be moved in their own planes about their common central axis into positions of engagement with one or the other of the contact points in the frame lying in the plane thereof, thereby varying the resistance to a current sought to be passed therethrough.

In testimony whereof, I sign this specification in the presence of two witnesses.

HARRY W. WARD.

Witnesses:
 WILLIAM M. SWAN,
 JEFFERSON C. THERBER.